US012480347B2

(12) United States Patent
Giovannetti

(10) Patent No.: US 12,480,347 B2
(45) Date of Patent: Nov. 25, 2025

(54) MECHANISM OF MOVEMENT OF AN UPWARD-TILTING DOOR

(71) Applicant: EFFEGI BREVETTI S.R.L., Segrate (IT)

(72) Inventor: Antonio Giovannetti, Segrate (IT)

( * ) Notice: Subject to any disclaimer, the term of this patent is extended or adjusted under 35 U.S.C. 154(b) by 0 days.

(21) Appl. No.: 18/832,226

(22) PCT Filed: Dec. 21, 2022

(86) PCT No.: PCT/EP2022/087226
§ 371 (c)(1),
(2) Date: Jul. 23, 2024

(87) PCT Pub. No.: WO2023/143835
PCT Pub. Date: Aug. 3, 2023

(65) Prior Publication Data
US 2025/0101788 A1 Mar. 27, 2025

(30) Foreign Application Priority Data
Jan. 26, 2022 (IT) ........................ 102022000001286

(51) Int. Cl.
*E05F 1/12* (2006.01)

(52) U.S. Cl.
CPC ....... *E05F 1/1261* (2013.01); *E05Y 2201/688* (2013.01); *E05Y 2900/20* (2013.01)

(58) Field of Classification Search
CPC ..... E05F 1/1261; E05F 1/1253; E05F 1/1269; E05F 1/1276; E05F 5/02; E05F 5/10
See application file for complete search history.

(56) References Cited

U.S. PATENT DOCUMENTS 8,959,709 B2 * 2/2015 Hasegawa ................. E05F 5/00 16/50
9,353,562 B2 * 5/2016 Oshima ................. E05F 1/1058
(Continued)

FOREIGN PATENT DOCUMENTS

EP 3874105 B1 8/2022
WO 2019091968 A1 5/2019
(Continued)

OTHER PUBLICATIONS

International Search Report for corresponding PCT/EP2022/087226 dated Apr. 19, 2023.
(Continued)

*Primary Examiner* — Jeffrey O'Brien
(74) *Attorney, Agent, or Firm* — Egbert, McDaniel & Swartz, PLLC

(57) ABSTRACT

Mechanism for moving a furniture item door with an upward-tilting opening, the mechanism being contained in a box having two half-shells, and including a hinge with five points (P1, P2, P3, P4, P5), having three levers (L1, L2, L3), the levers (L1, L2) are articulated one with the other at the fulcrum point (P2), arranged in one of their intermediate zones, lever (L2) is articulated at one of its end in the fulcrum point (P3) to one end of the lever (L3), the other end is articulated to the door in the point (P4), one end of lever (L1) is articulated to the door at the point (P5), while the other end of lever (L1) carries a pin sliding in a track formed in the box, lever (L2) being likewise articulated to the box in the fulcrum point (P1), around which it rotates during the movement of the door.

8 Claims, 15 Drawing Sheets

(56) References Cited

U.S. PATENT DOCUMENTS

| | | | | |
|---|---|---|---|---|
| 9,464,473 | B2 * | 10/2016 | Baldreich | E05F 1/1058 |
| 10,914,106 | B2 * | 2/2021 | Salice | E05F 3/104 |
| 11,603,687 | B2 * | 3/2023 | Giovannetti | E05F 5/02 |
| 12,000,200 | B2 * | 6/2024 | Hirtsiefer | E05F 1/105 |
| 12,037,825 | B2 * | 7/2024 | Boesch | E05F 1/1261 |
| 12,116,819 | B2 * | 10/2024 | Baldreich | E05D 3/14 |
| 12,129,700 | B2 * | 10/2024 | Holzapfel | E05D 15/40 |
| 12,158,034 | B2 * | 12/2024 | Gabel | E05D 15/40 |
| 12,188,275 | B2 * | 1/2025 | Gabl | E05D 15/40 |
| 12,188,277 | B2 * | 1/2025 | Reissig | E05D 15/40 |
| 12,264,531 | B2 * | 4/2025 | Folie | E05D 15/262 |
| 12,276,148 | B2 * | 4/2025 | Flogaus | E05F 1/1261 |
| 12,359,482 | B2 * | 7/2025 | Holzapfel | E05F 5/02 |
| 12,359,489 | B2 * | 7/2025 | Grimm | E05F 1/1261 |
| 12,378,807 | B2 * | 8/2025 | Baldreich | E05F 1/1261 |
| 2004/0239213 | A1 * | 12/2004 | Hirtsiefer | E05F 1/1058 312/109 |
| 2015/0240546 | A1 * | 8/2015 | Oshima | E05F 1/14 16/80 |
| 2015/0361709 | A1 * | 12/2015 | Stuke | E05F 5/10 16/352 |
| 2021/0148149 | A1 * | 5/2021 | Pleuteri | E05D 5/0276 |
| 2023/0088619 | A1 * | 3/2023 | Cai | E05F 1/10 16/382 |
| 2023/0272648 | A1 * | 8/2023 | Baldreich | E05D 3/00 312/325 |
| 2023/0272655 | A1 * | 8/2023 | Baldreich | E05D 15/40 49/381 |
| 2024/0318482 | A1 * | 9/2024 | Schuler | E05D 7/123 |
| 2025/0034925 | A1 * | 1/2025 | Pedrosa Fernandez | E05D 15/401 |
| 2025/0101787 | A1 * | 3/2025 | Tofall | E05D 3/02 |
| 2025/0101789 | A1 * | 3/2025 | Tofall | E05F 5/06 |
| 2025/0116143 | A1 * | 4/2025 | Tofall | E05D 11/06 |

FOREIGN PATENT DOCUMENTS

| | | | | |
|---|---|---|---|---|
| WO | 2020089040 | A1 | 5/2020 | |
| WO | WO-2020212086 | A1 * | 10/2020 | E05D 3/142 |
| WO | 2020232484 | A1 | 11/2020 | |

OTHER PUBLICATIONS

Written Opinion of the International Searching Authority for corresponding PCT/EP2022/087226 dated Apr. 19, 2023.

International Preliminary Report on Patentability for corresponding PCT/EP2022/087226 dated Sep. 18, 2023.

* cited by examiner

MECHANISM OF MOVEMENT OF AN UPWARD-TILTING DOOR

The subject of the present invention is a mechanism for movement of a door of an item of furniture, more particularly a door with upward-tilting opening.

The mechanisms for actuating doors with upward-tilting opening, whereto the present invention specifically relates, comprise a lever mechanism for actuating a spring assembly, loaded in the phase of closure of the door and unloaded when the door is in the phase of opening. Commercially available mechanisms for the aforementioned objects are not entirely satisfactory, either because they do not allow the door to remain stationary in all opening positions required by the user, or because they cause slams at the end of the opening and/or closing strokes of the door.

Moreover, these known mechanisms are often of considerable size and therefore very noticeable inside the item of furniture.

EP 3874105B1, in the name of the same Applicant, describes a mechanism of movement of a door of an item of furniture with downward tilting. The mechanism comprises a plurality of articulated levers placed between the body of the furniture item and the door to be moved. One of these levers acts on the front side of a first linear slider, the rear side of which acts, by means of a rocker lever, on a second linear slider, which moves in the opposite direction to the first. The second slider is subjected to the action of springs that are loaded in the phase of opening and help to lift the door in the phase of closing. Two dampers are placed in the first linear slider, one to dampen the fall of the door in the phase of opening, the other to dampen the final part of the upward stroke of the door in the phase of closing.

Such a mechanism, in which the springs indirectly exert a thrust on the door always in the same direction in the phase of closing, would not be suitable for moving an upward-tilting door, in which it is necessary to support the weight of the door in every position, and a reversal of the thrust of the springs in the final closing phase is required.

WO 2020/232484 describes a mechanism of movement of an upwardly tilting door of an item of furniture comprising a spring assembly mounted oscillatingly that acts on a presser element, constrained, via an intermediate oscillating lever, to an articulated lever system connected to the door to be moved.

The object of the invention is to eliminate the disadvantages of the prior art described above.

More particularly, an object of the invention is to provide a mechanism for movement of a door with an upward-tilting opening that allows the door to be stopped in all positions required, both in opening and in closing, with minimal effort on the part of the user.

Another object of the invention is to provide a mechanism that avoids slamming of the door at the end of the opening and closing strokes.

Yet another object of the invention is to provide such a mechanism that is simple and inexpensive to manufacture.

These and other objects of the invention are achieved by the mechanism for movement of upward-tilting doors that has the features of the appended independent claim 1.

Advantageous embodiments of the invention are disclosed in the dependent claims.

Substantially, the mechanism for movement of a door of an item of furniture with upward-tilting opening, suitable for being placed on a side of the furniture item, is contained in a box made up by two half-shells, and comprises a hinge comprising a plurality of levers, articulated one to the other, to the box and to the door for the movement of the latter, one of said levers being able to slide in a track formed in the box, another of said levers being able to rotate around a fulcrum point provided on the box and acting directly or indirectly on a cam profile of a linear slider, subjected to the direct action of elastic means generating a force that tends to open the mechanism and therefore to support the weight of the door.

According to one of the alternative embodiments, a pin is connected to the end of this latter lever, free to slide simultaneously in two cam slots: the first formed on the aforementioned lever, and the other formed in fixed position on the two shells of the mechanism that are then fixed to the side of the furniture item. This pin is fulcrumed in another lever in turn fulcrumed in a push rod. This push rod is hinged at one end to a fixed centre formed on the shells. The other end acts on a linear slider on which the elastic means act.

Further Features of the Invention Will be Made Clearer by the Following Detailed Description, Referring to its Embodiments Merely by Way of Non-Limiting Example, Illustrated in the Accompanying Drawings, in which.

Figure 2:
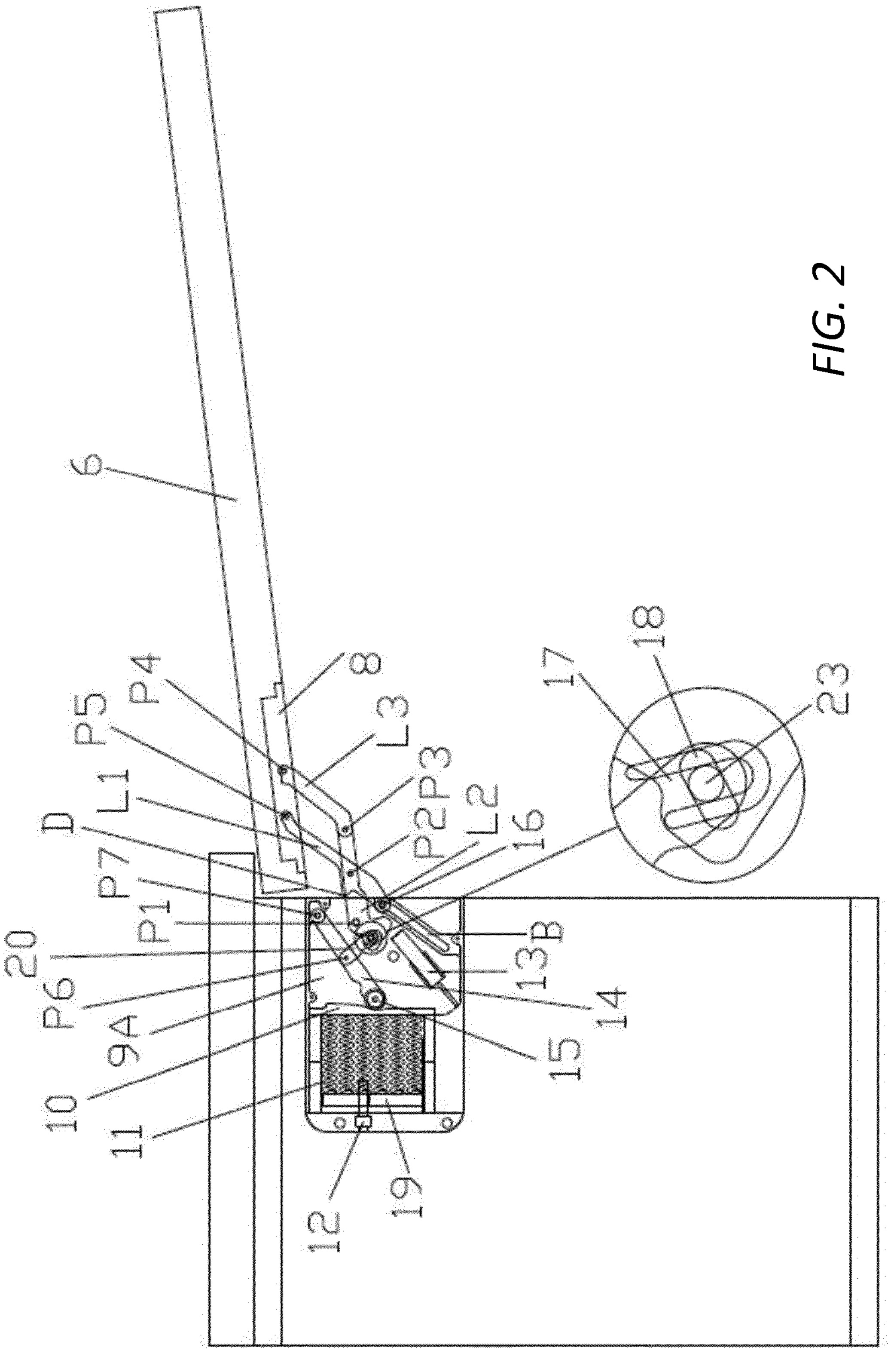
FIG. 2 is a view of the inner side of the furniture item of FIG. 1, with the lid of the box for containing a mechanism according to a first embodiment of the invention removed and with the door in an open position.
Figure 3:
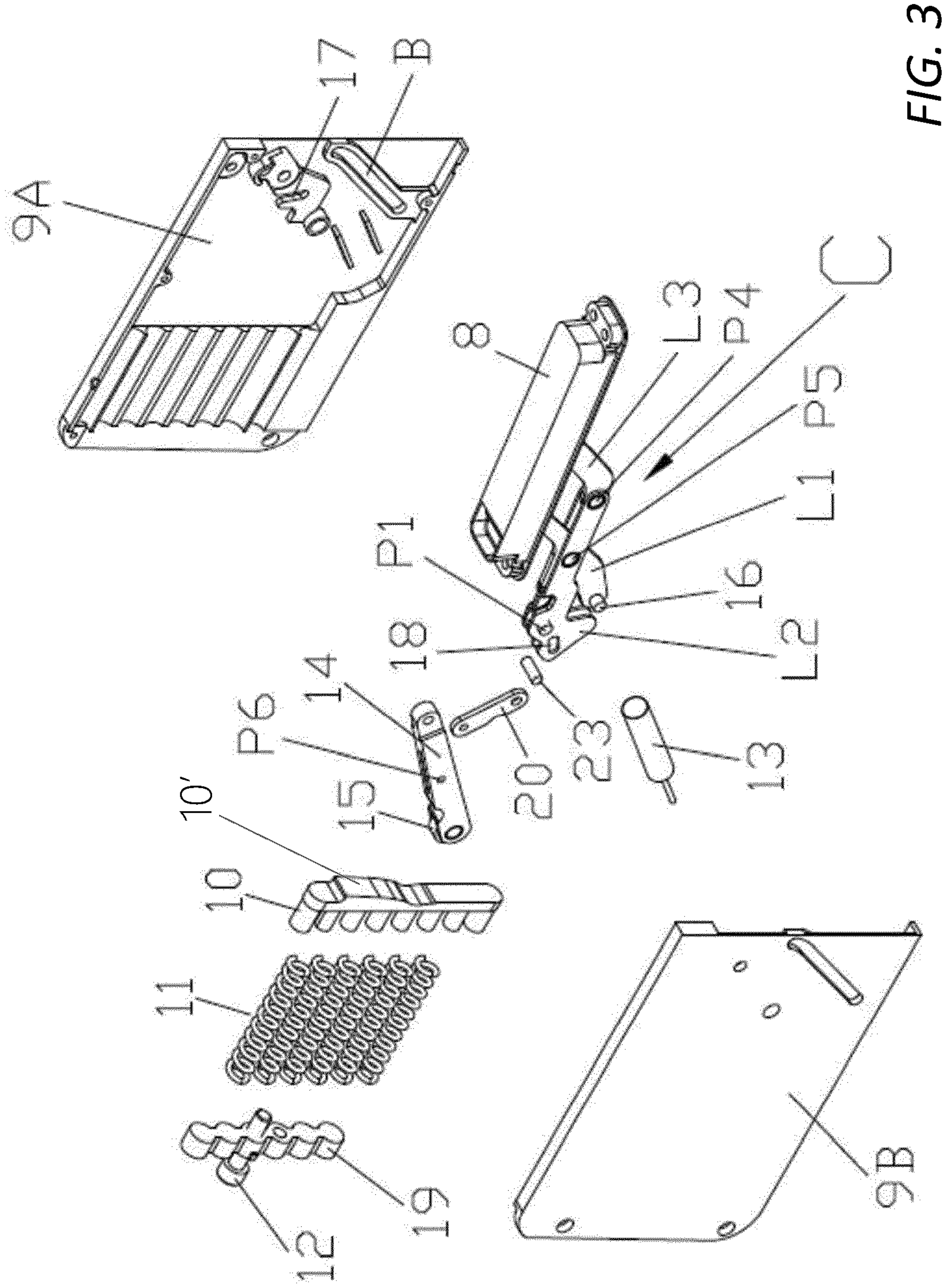
Figure 4:
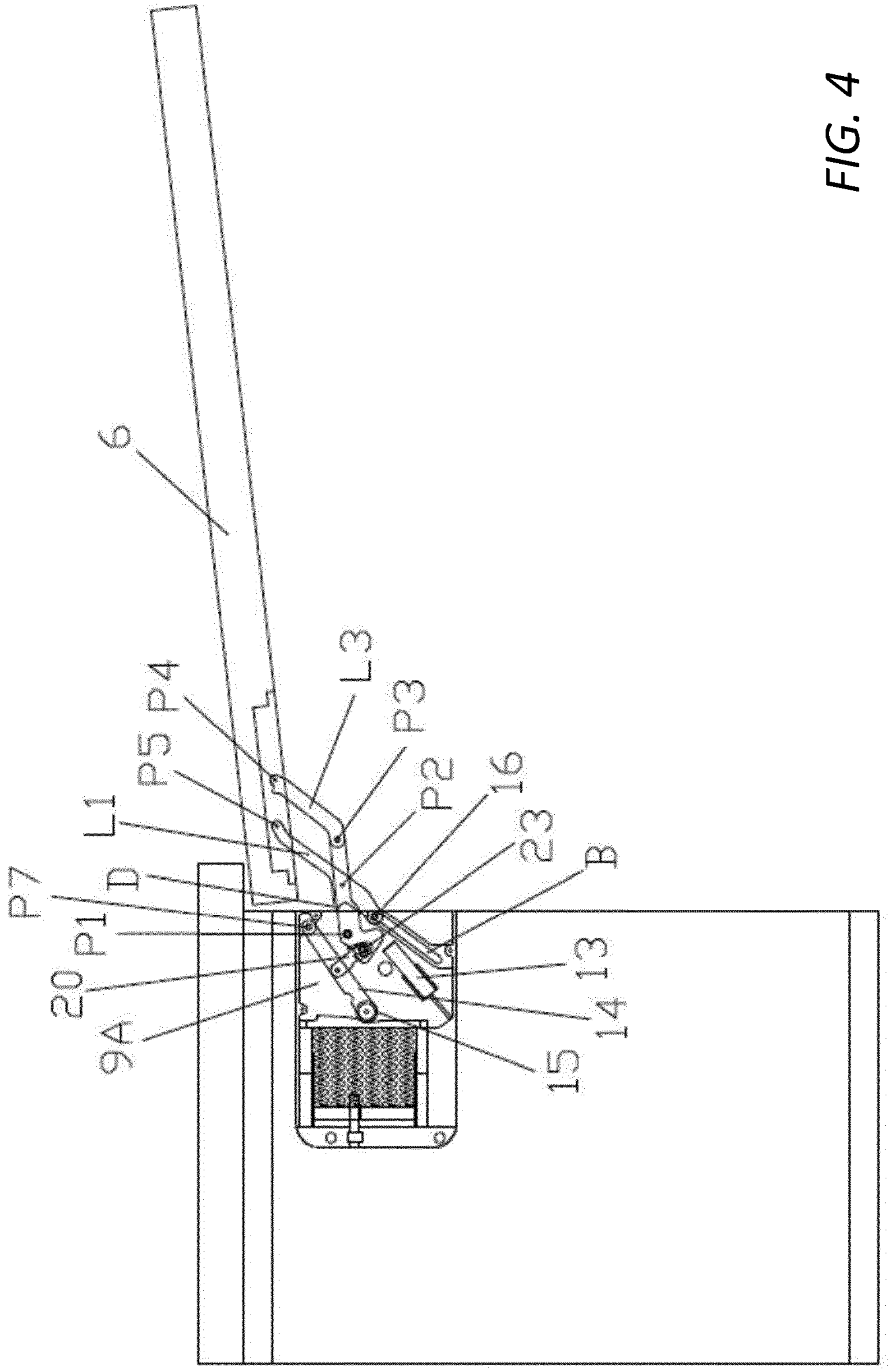
Figure 5:
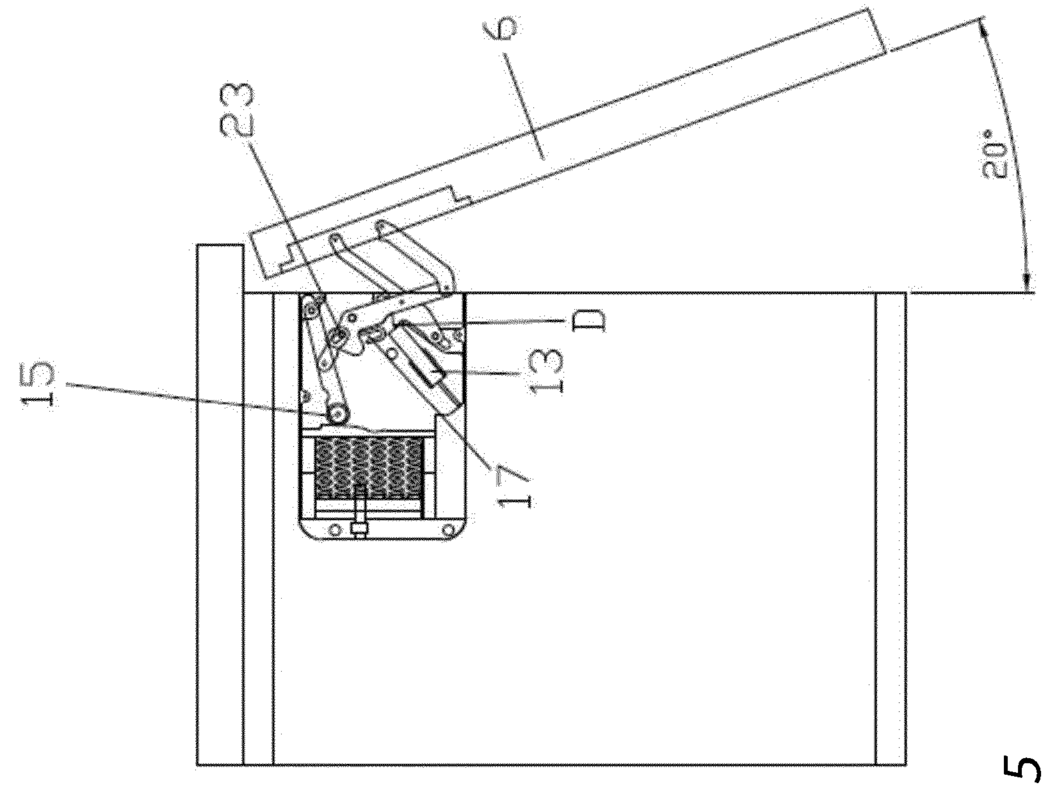
Figure 6:
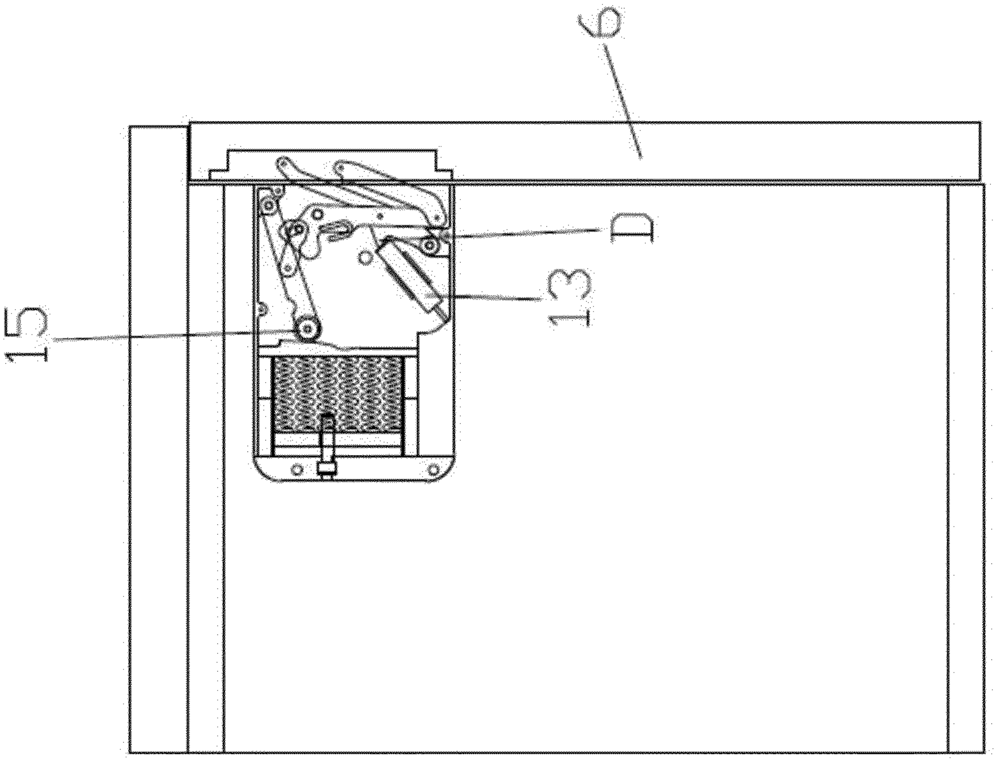
Figure 7:
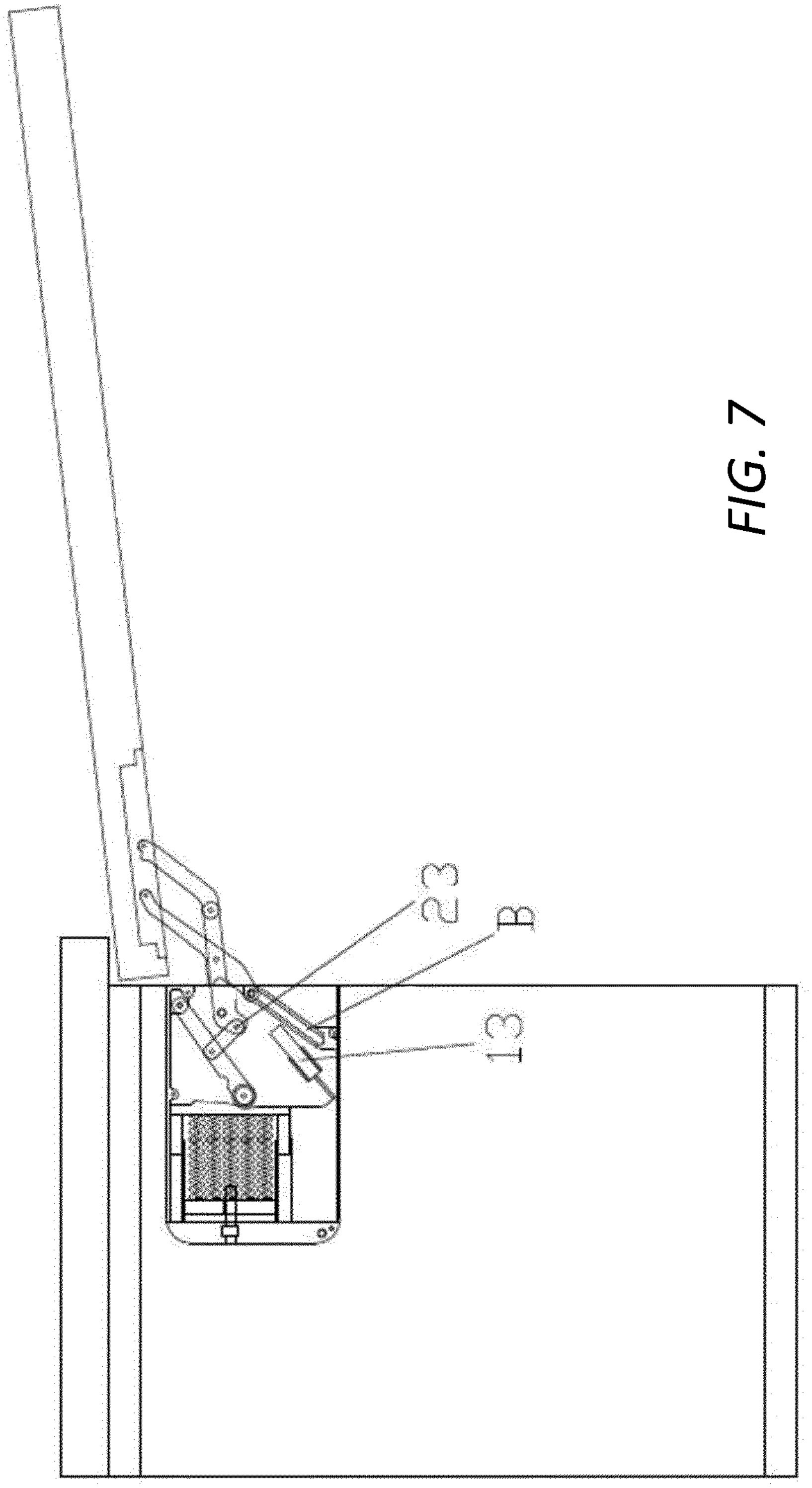
Figure 7A:
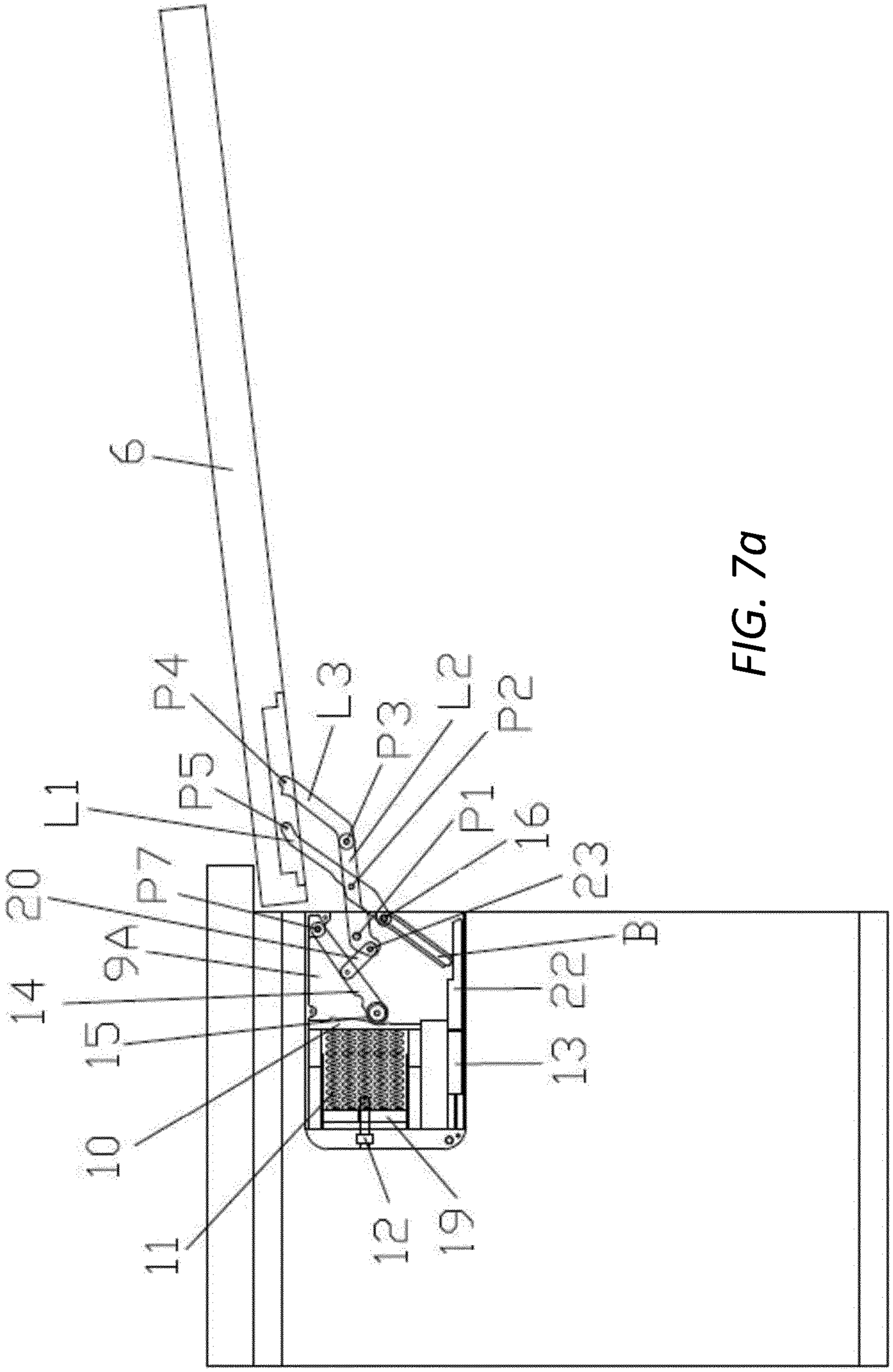
Figure 8:
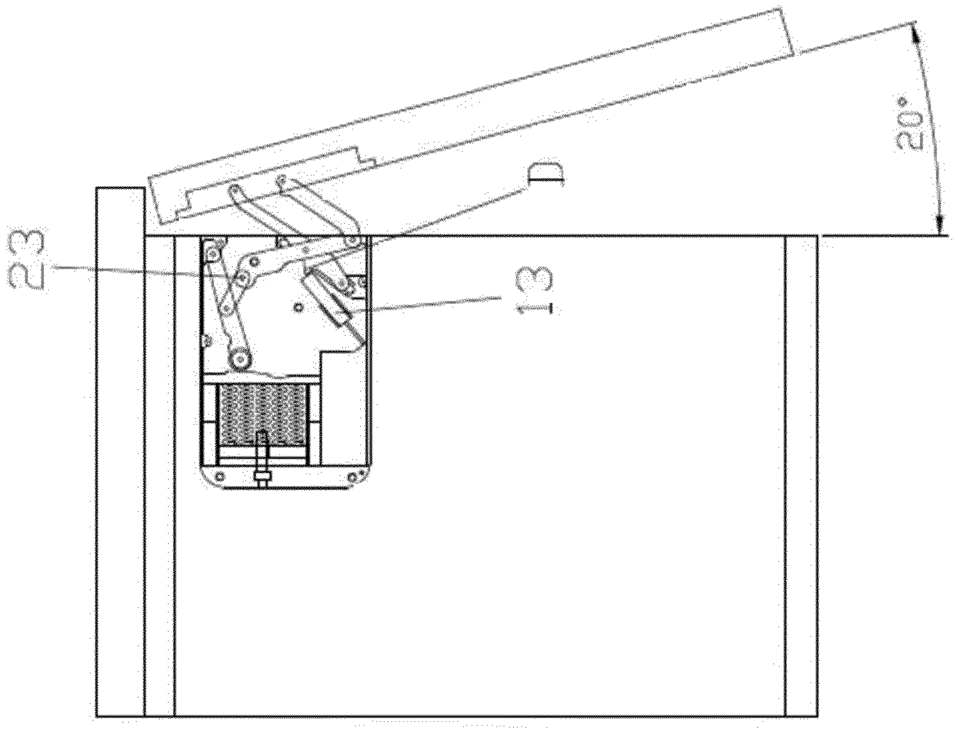
Figure 8A:
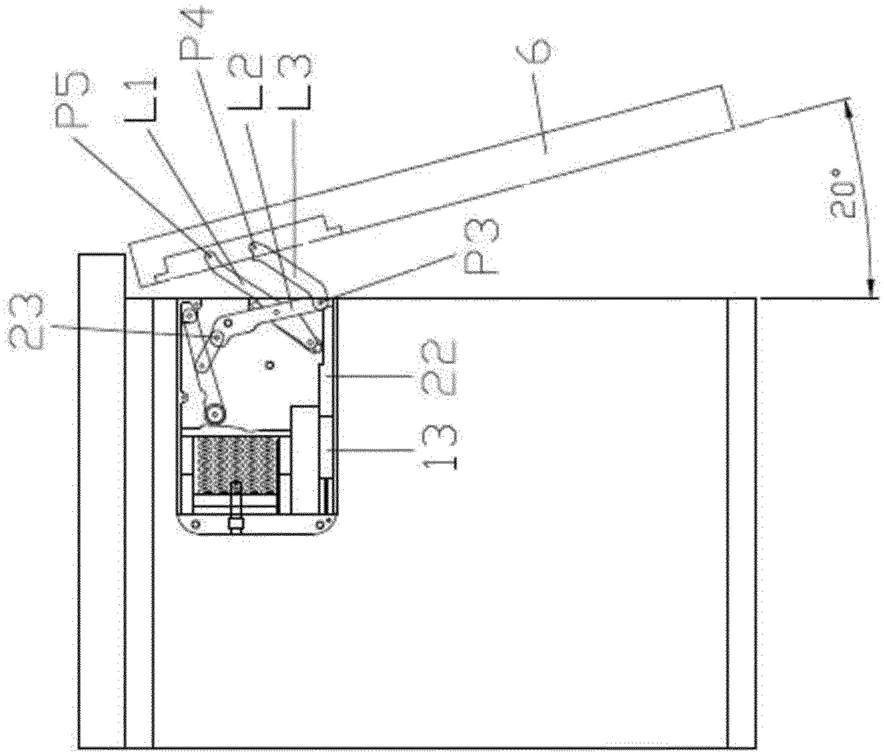
Figure 9:
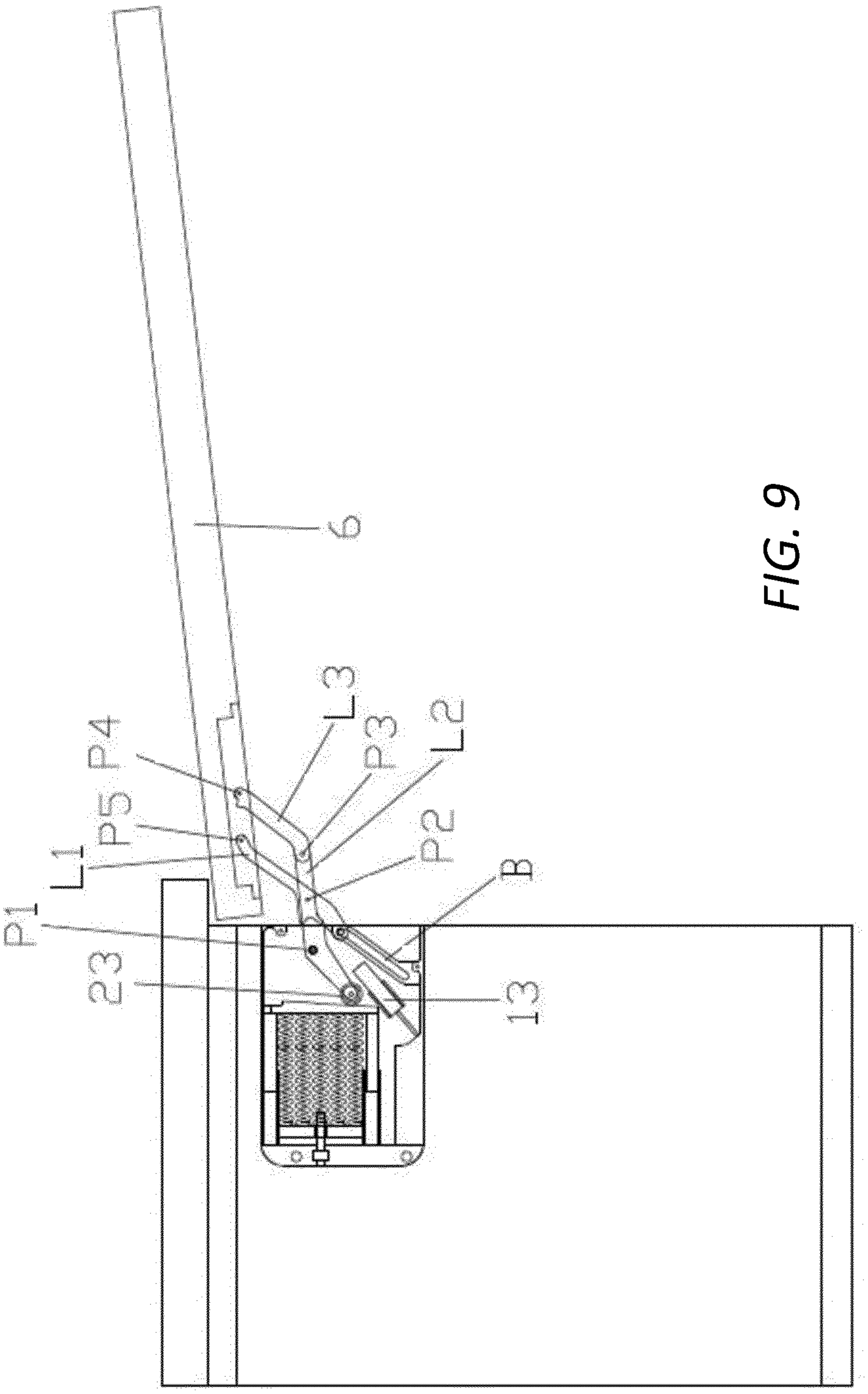
Figure 10:
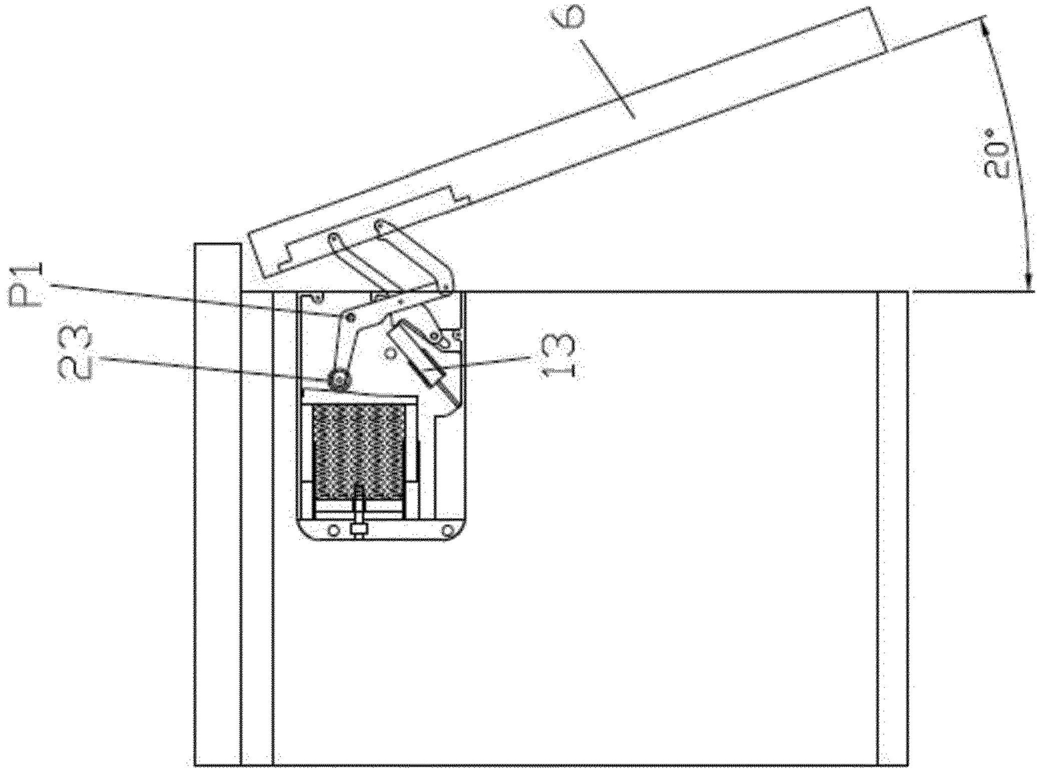
Figure 11:
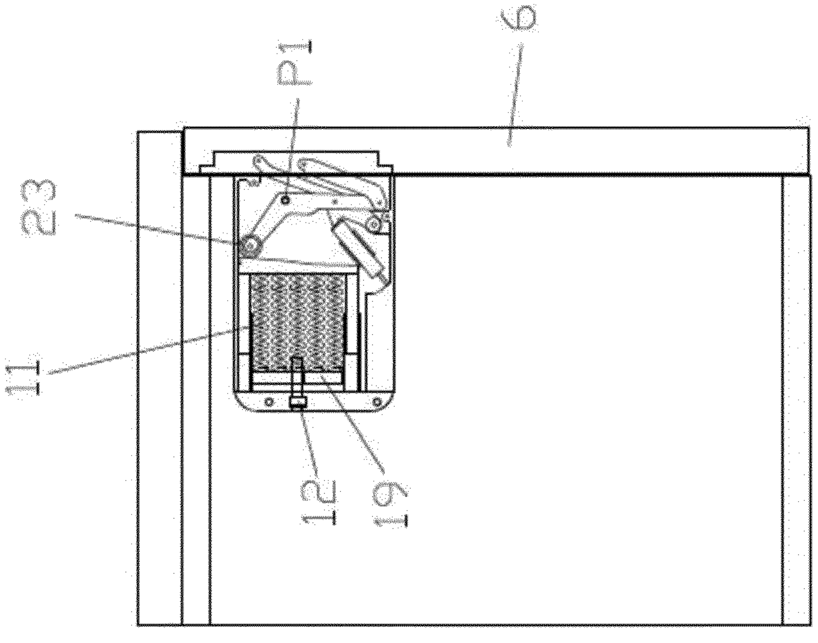
Figure 12:
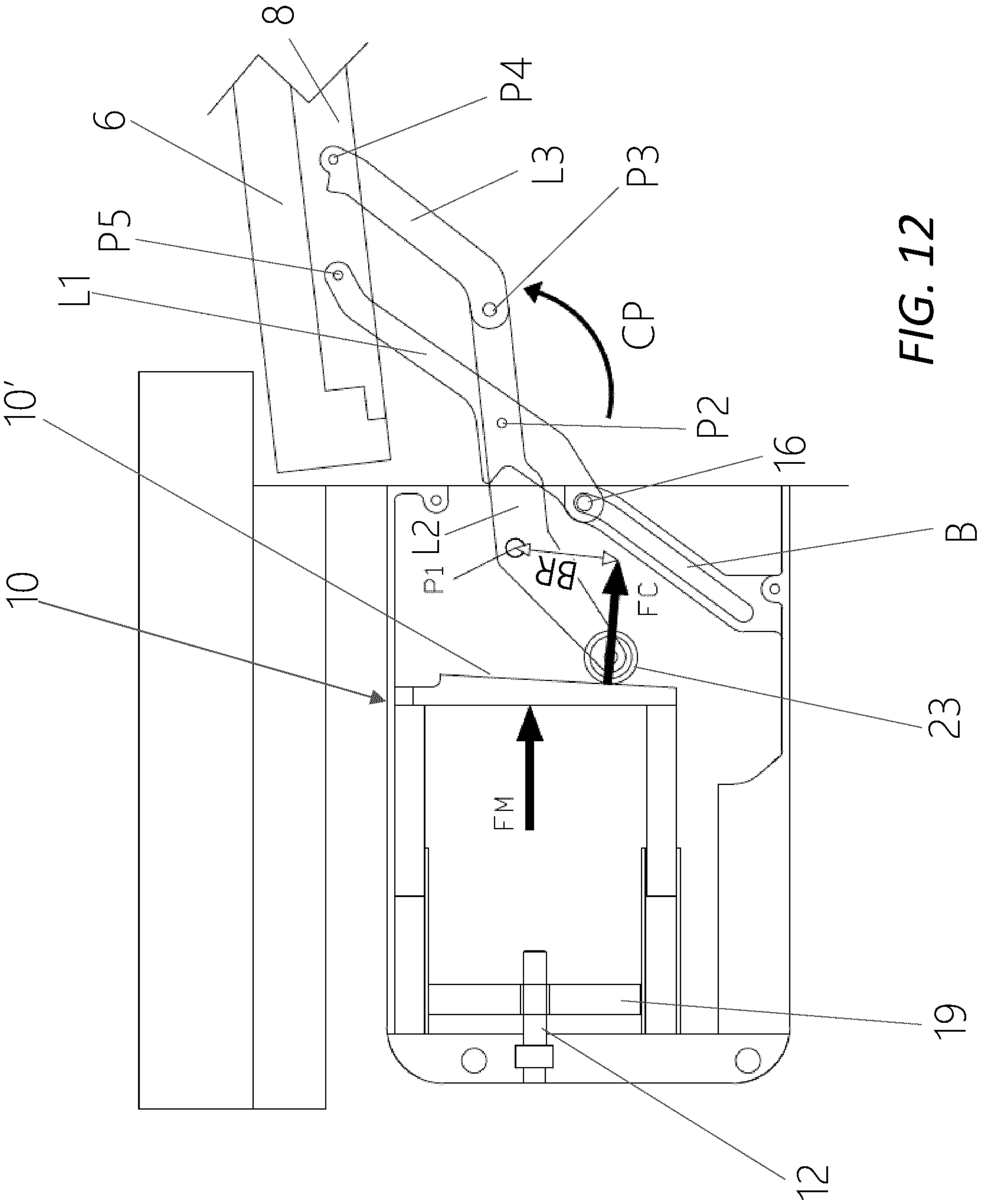
Figure 13:
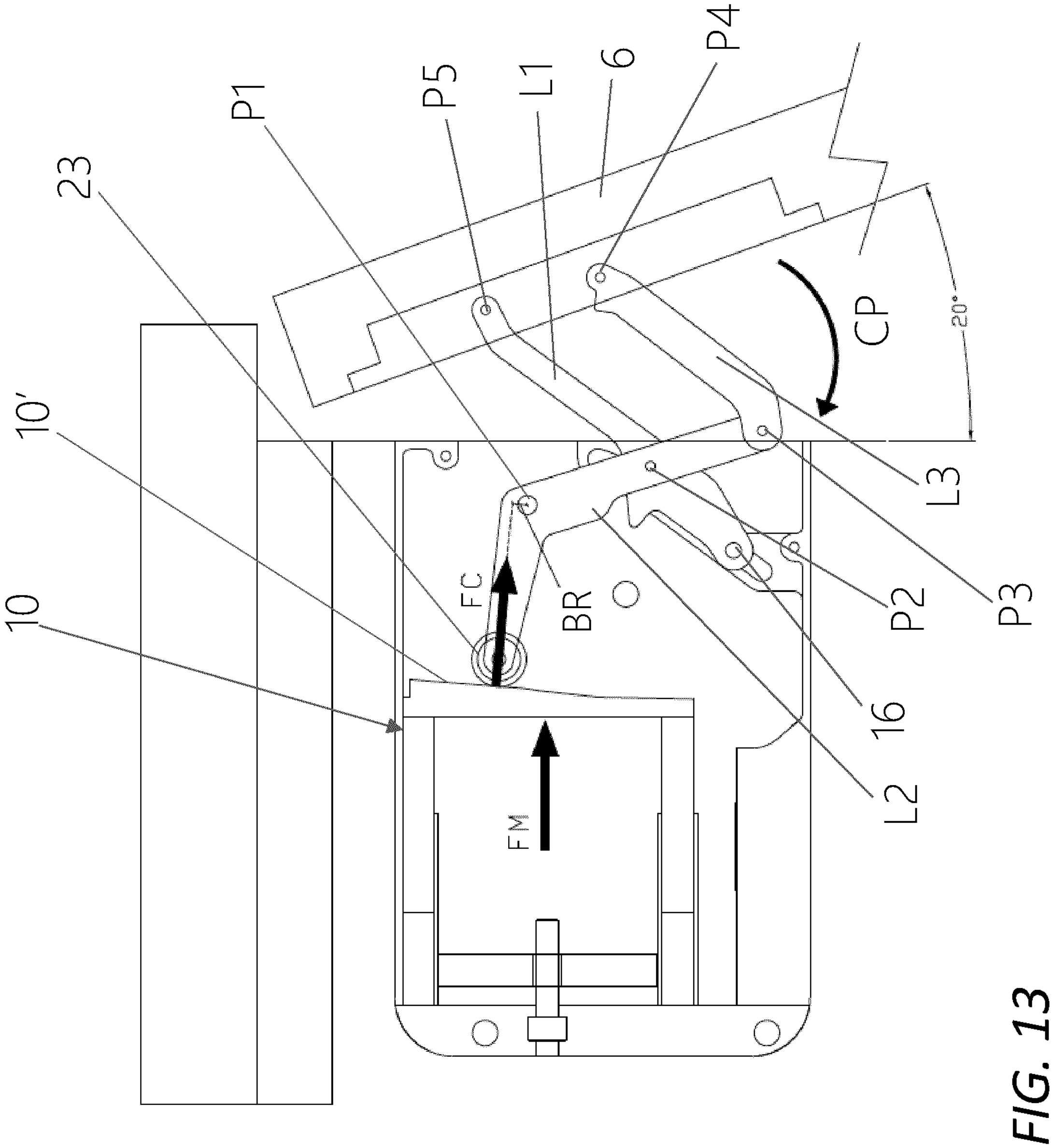

FIG. 2*a* is an enlargement of the circled detail in FIG. 2;

FIG. 3 is a blown-up view of the mechanism of FIG. 2;

FIGS. 4, 5, 6 are views like that of FIG. 2, showing various positions of the door in a closing or opening cycle;

FIGS. 7 and 8 are views like FIGS. 4 and 5, respectively, showing a simplified mechanism, according to a second embodiment of the invention;

FIGS. 7*a* and 8*a* are views like FIGS. 7 and 8, showing a different arrangement of the damper;

FIGS. 9, 10, 11 are views similar to FIGS. 4, 5, 6, respectively, showing a further simplified mechanism, according to a third and preferred embodiment of the invention;

FIGS. 12 and 13 are simplified views of FIGS. 9 and 10, respectively, on which the forces and torques that tend to open and close the door have been schematically shown.

Figure 1:
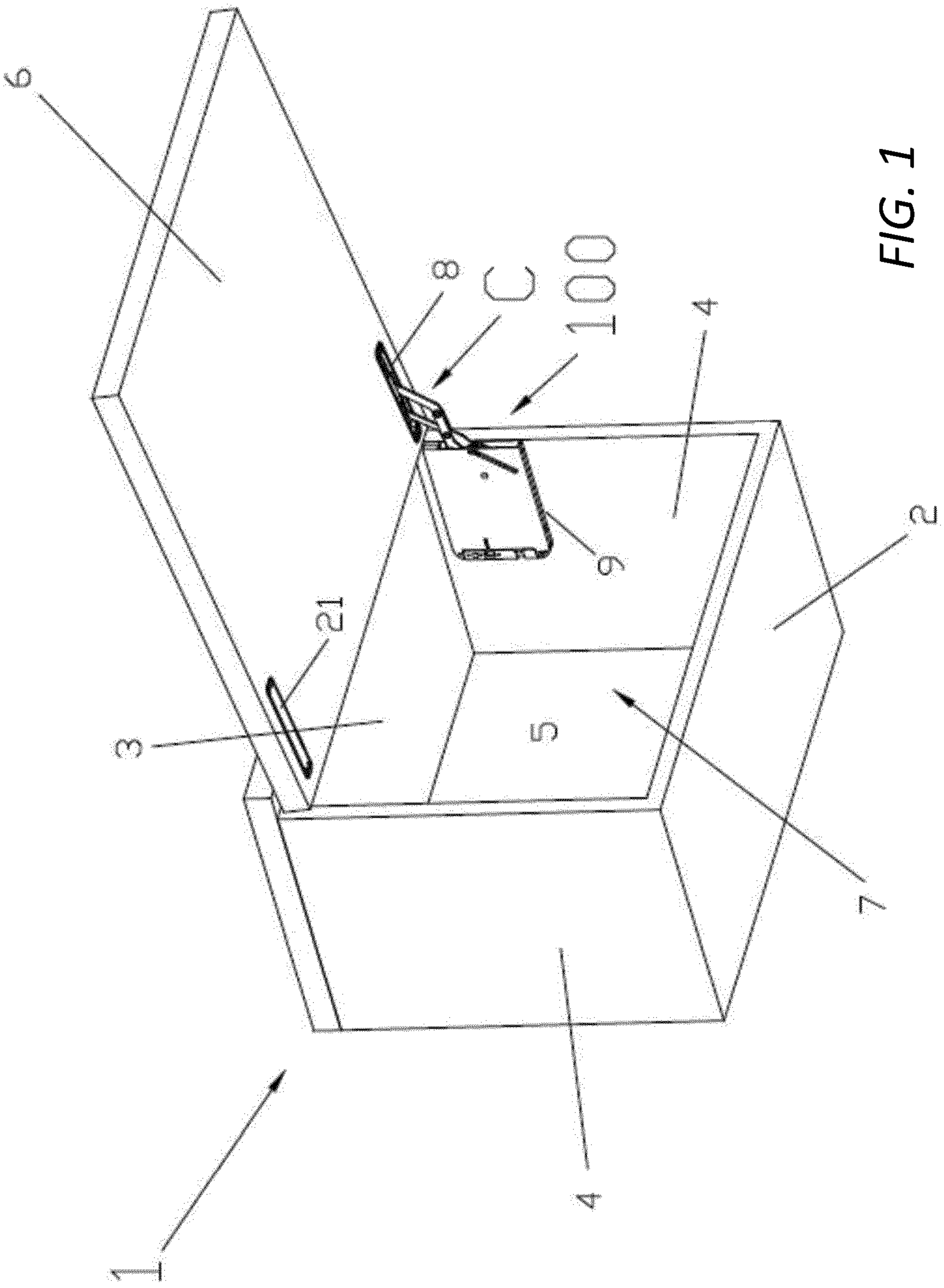
FIG. 1 is a schematic axonometric view of a furniture item with door with upward-tilting opening provided, on one of its sides, with a movement mechanism according to any one of the embodiments of the invention.

FIG. 1 shows an item of furniture, e.g. a kitchen furniture item, denoted overall by reference numeral (1), comprising a fixed frame consisting of a lower shelf or wall (2), an upper shelf or wall (3), two sides or side walls (4), an optional back wall (5) and a front door (6), of the type with upward tiling opening which, in lowered position, closes an interior compartment (7) of the furniture item.

The movement mechanism according to the invention is denoted overall by reference numeral (100) and is applied on a side 4 of the furniture item. In FIG. 1, the mechanism (100) is applied internally to the side (4) and, for aesthetic reasons, is covered by a cap or counter cover shoulder.

However, the mechanism (100) can also be housed inside the side (4).

Referring now to FIGS. 2 and 3, the structure of the mechanism (100) is illustrated, according to a first embodiment of the invention, the components of which are mounted in a box (9), made up of two half-shells (9A) and (9B), which will be referred to hereafter as base and lid respectively, and impart movement to the door (6) by means of a five-point hinge (P1), (P2), (P3), (P4), (P5) and an attachment (8) housed in a seat (21) formed internally to the door. In FIG. 1, this seat (21) is shown on both sides of the door (6), in such a way as to accommodate the attachment 8 of a mechanism (100) applied on both sides of the furniture item (1).

The hinge (C) is made up of three levers (L1), (L2), (L3).

Levers (L1) and (L2) are articulated one to the other at the fulcrum point (P2), placed in one of their intermediate zones. Lever (L2) is articulated at one of its ends in the fulcrum point (P3) to one end of the lever (L3), the other end of which is articulated to the attachment (8) in the point (P4) which is then fixed to the door (6). One end of lever (L1) is articulated to the attachment (8) in the point (P5) which is then fixed to the door (6), while the other end of lever (L1) carries a pin (16) sliding in a track (B) formed in the box (9).

Lever (L2) is articulated in the fulcrum point (P1) that is also restrained to the box (9).

Hinge C structured in this way is forced, during the movement of the door 6, to rotate around the fulcrum point (P1) and to slide in the track (B), formed in the two half-shells (9A) and (9B) of the box (9).

Track (B) can have either a linear or curvilinear trend. In fact, by varying the position of fulcrum point (P1) and the shape of track (B), it is possible to obtain different door rotations (6), for example on the basis of the thickness of the latter.

The functioning of the mechanism is now described, introducing on each occasion the essential elements that compose it, with reference to this first embodiment, which is the one that is most complex structurally.

A linear or curvilinear slot (18) is formed on the lever (L2) in which a pin (23) is housed. This pin is free to slide simultaneously in this slot and in a second slot (17) (see, in particular, FIG. 2*a*), formed in the box (9) and fixed with respect to the side of the furniture item.

The pin (23) is also fulcrumed in a lever (20). This lever in turn is free to rotate in a fulcrum point (P6) formed on a push rod (14).

This push rod (14) is fulcrumed in one end to rotate in a centre of rotation (P7) formed on the box (9).

In the other end of the push rod (14) a roller (15) is housed that acts on the cam profile (10') of a linear slider (10).

This slider moves linearly and is under the direct action of elastic means, in particular springs (11), the number of which is variable.

These springs abut on a regulator (19), the position of which can be adjusted by means of a screw (12) to vary the compression of the springs and therefore the force that they develop, in order to adapt to doors of different height and weights, within a certain operating range. In the accompanying drawings the regulation screw (12) is shown in the rear part of the slider (10), where the regulator (19) is provided, but it is clear that these elements can be placed in the front part of the slider.

When the door (6), under the action of its own weight, naturally tends to fall downwards, the springs (11), by compressing, contrast the fall thereof. The force generated by the springs, in whatever position the door is, is exactly that necessary for contrasting its weight. This perfect equilibrium allows the door to remain stationary in whatever position it is left in during opening or closing.

The springs 11 tend, through the action of the kinematics described hitherto, to generate a force that tends to open the mechanism and therefore to support the weight of the door.

However, according to a preferred embodiment, in the final phase of closure of the door, for example starting at 20°, and up to complete closure of the door (FIGS. 5 and 6), thanks to the mechanism designed in this way and to the profile of the linear slider (10), there can be an inversion of the thrust of the springs (11), which tend to make the door close automatically, making it come to abut on the front part of the furniture item (without the aid of the force of the external user).

This behaviour of the thrust of the springs will be explained here below with reference to FIGS. 12 and 13 of the third and simplest embodiment of the invention.

In order to prevent the door from slamming against the furniture item, it is slowed down by the presence of a damper 13. This is actuated by a protuberance D formed on the lever (L1), which goes to impact on the damper, compressing it.

From what has been disclosed, the advantages are clear of the mechanism of movement of doors with upward-tilting opening according to the invention, which allows a gradual movement of the door in both opening and closing and a dampening of the same in the final closing phase.

The second embodiment of the invention is now described with reference to FIGS. 7 and 8, which are views showing two positions of the door in a closing or opening cycle of the mechanism.

In these drawings, the same reference numerals as in the previous embodiment are given to distinguish the same or similar elements.

The mechanism of the present embodiment, a simplification of the preceding one, differs from it substantially in that the pin (23), fulcrumed to the lever (20), is fulcrumed directly to one end of the lever (L2), which makes it possible to eliminate the use of slots (18) and (17), provided on the lever (L2) and on the box (9) respectively.

The functioning of this mechanism is identical to that of the first embodiment, so it will not be described further.

FIGS. 7*a* and 8*a* show a variant of the second embodiment, in which the damper (13), instead of being inclined, is in horizontal position, on the bottom of the box (9), and is actuated by the lever (L2) which, rotating clockwise, impacts on a slider (22). This slider, moving backwards, hits the damper (13), which compresses, slowing down the closing of the door (6). Naturally, the lever (L2) could act directly on the damper (13), which in this case would be placed in front of the slider (22), the position of which can be adjusted, for example by means of a screw, to vary the angle of intervention of the damper.

This variant of the positioning of the damper (13) is obviously also applicable to the first embodiment of the invention and the subsequent third embodiment, which will now be described with reference to FIGS. 9 to 11, which are views showing various positions of the door in a closing or opening cycle of the mechanism.

According to this third embodiment of the invention, which is further simplified with respect to the preceding one, the lever (L2) acts directly as push lever, and for this purpose, a roller, still denoted by reference numeral (23), is housed at its end and which acts on the cam profile (10') of the linear slider (10).

The functioning of this mechanism is identical to that of the previous embodiments.

Referring to FIGS. 12 and 13, which are simplified views of FIGS. 9 and 10, respectively, a possible behaviour of the thrust of the springs (11) is now described, which is applicable to all three embodiments illustrated.

FIG. 12 schematises the action of the forces and of the torques generated, representative for an angle of opening ranging from approx. 20° to complete opening of the door (approx. 95°).

In this drawing, the horizontal force generated by the springs (11) (not shown) on the slider (10) has been denoted by FM. The force FM is transmitted through the cam profile (10') of the slider (10) to the roller (23) of the hinge as force FC, which is that which effectively generates the torque that causes the hinge to rotate about the rotation point (P1). As can be seen from the drawing, this force FC has an arm BR with respect to the centre of rotation P1. The torque CP that is generated is anticlockwise and would therefore tend to make the hinge and therefore the door open. However, the shape and inclination of the cam (10') are such that the torque CP generated on the hinge is in equilibrium with the contrary torque generated by the door due to its weight, so that, as mentioned, the door is held stationary in any position in the aforementioned angular range.

FIG. 13 schematises the action of the forces and of the torques for angles of opening of the door between approximately 20° and 0° (complete closure of the door). In this case, the arm BR of the force FC 'tips up', producing an inversion of the thrust of the springs. As a result, the torque CP that is generated is no longer anticlockwise but clockwise. This torque therefore tends to make the hinge and therefore the door close.

Clearly, while in FIG. 12 the torque generated on the hinge is opposite to that generated by the door with its weight, in FIG. 13 the torque CP is concordant with the torque generated by the door with its weight, producing the automatic closing of the door, which is dampened by the damper (13), not shown in the drawing and preferably actuated directly by the lever (L2).

Substantially, therefore, the cam profile (10') of the slider (10) is such that the springs generate a force which tends to open the mechanism and therefore to support the weight of the door and, in the last phase of closing of the door, causes an inversion of the thrust of the springs (11) which tend to make the door close automatically.

Naturally, the invention is not limited to the particular embodiments previously described and illustrated in the accompanying drawings, but numerous detailed changes may be made thereto within the reach of the person skilled in the art, without thereby departing from the scope of the invention itself, as defined by the appended claims.

The invention claimed is:

1. A mechanism configured for moving a furniture item door with an upward-tilting opening, configured for being arranged on or within a side of a furniture item, said mechanism comprising a box comprising two half-shells (9A, 9B), and comprising a hinge (C) contained in the box, the hinge comprising a first fulcrum point (P1), a second fulcrum point (P2), a third fulcrum point (P3), a fourth fulcrum point (P4), a fifth fulcrum point (P5), a first lever (L1), a second lever (L2), and a third lever (L3), the first and second levers (L1, L2) are articulated to one another at the second fulcrum point (P2), arranged in an intermediate zone of one of the first and second levers (L1, L2), the second lever (L2) is articulated at a first end at the third fulcrum point (P3) to a first end of the third lever (L3), an opposite end of the third lever (L3) is articulated to the door at the fourth fulcrum point (P4), a first end of the first lever (L1) is articulated to the door at the fifth fulcrum point (P5), an opposite end of the first lever (L1) carries a pin sliding in a track formed in the box, the second lever (L2) being articulated to the box at the first fulcrum point (P1), around which the second lever rotates during movement of the door;

wherein said second lever (L2) acts directly or indirectly on a cam profile of a linear slider, subjected to a direct action of elastic means generating a force that opens the mechanism and therefore supports a weight of the door, in a last phase of closing of the door said cam profile causes an inversion of a thrust of the elastic means which makes the door close automatically; and wherein a damper is provided in said box which is actuated during closing of the door by one of said first and second levers (L1, L2).

2. The mechanism according to claim 1, wherein said second lever (L2) carries at a free end opposite the first end of the second lever, a roller which acts on said cam profile of the linear slider.

3. The mechanism according to claim 1, wherein said second lever (L2) carries at a second end a second pin fulcrumed at one end of a fourth lever (20), an opposite end of the fourth lever is articulated at a sixth fulcrum point (P6) formed on a push rod fulcrumed at a first end to rotate at a centre of rotation formed on the box and carrying at an opposite end a roller that acts on said cam profile of the linear slider.

4. The mechanism according to claim 3, wherein a linear or curvilinear slot is formed on the second lever (L2) in which said second pin is housed, said second pin is free to slide simultaneously in the linear or curvilinear slot of the second lever and in a second slot formed in the box and fixed with respect to the side of the furniture item.

5. The mechanism according to claim 1, wherein said elastic means are compression springs abutting a regulator, a position of said regulator is adjustable by means of a screw to vary the compression of the springs and therefore the force generated by the compression springs.

6. The mechanism according to claim 1, wherein said fourth and fifth fulcrum points of articulation of the third and first levers (L3, L1) of the hinge (C) to the door are provided in an attachment fixable to the door.

7. The mechanism according to claim 1, wherein said damper is in an inclined position with respect to the horizontal and is actuated during the closing of the door by a protuberance formed on said first lever (L1).

8. The mechanism according to claim 1, wherein said damper is in a horizontal position, on a bottom of the box, and is actuated during the closing of the door by said second lever (L2), which by rotating clockwise impacts on the damper or on a slider connected to the damper.

* * * * *